United States Patent [19]

Gannon

[11] 4,239,434
[45] Dec. 16, 1980

[54] WEIGHT CODED DELIVERY CONVEYOR SYSTEM

[75] Inventor: Donald N. Gannon, Dallas, Tex.

[73] Assignee: The Boeing Company, Seattle, Wash.

[21] Appl. No.: 28,570

[22] Filed: Apr. 9, 1979

[51] Int. Cl.³ .................. B65G 47/50; G05B 19/18; G01G 23/38; G06F 15/04
[52] U.S. Cl. ........................... 414/136; 177/4; 198/504; 209/942; 364/478; 364/567; 414/134
[58] Field of Search .................. 414/134, 136, 21; 198/504, 505, 356; 364/478, 479, 567; 186/58; 209/563–566, 521, 592–595, 942

[56] References Cited

U.S. PATENT DOCUMENTS

| | | | |
|---|---|---|---|
| 3,260,349 | 7/1966 | Vander Meer | 414/134 X |
| 3,419,128 | 12/1968 | Leonard | 414/134 X |
| 3,588,480 | 6/1971 | Unger et al. | 364/567 X |
| 3,679,874 | 7/1972 | Fickenscher | |
| 3,704,773 | 12/1972 | Lingg et al. | |
| 3,785,510 | 1/1974 | Grooteboer | 414/136 |
| 4,137,567 | 1/1979 | Grube | 364/478 |
| 4,181,947 | 1/1980 | Krauss et al. | 414/134 X |

Primary Examiner—Robert J. Spar
Assistant Examiner—Edward M. Wacyra
Attorney, Agent, or Firm—Christensen, O'Connor, Johnson & Kindness

[57] ABSTRACT

An apparatus for sorting items includes a plurality of receiving stations for receiving the unsorted items. Each of the receiving stations has associated with it a scale for sensing the weight of each item as it is received. The weight of each item is transmitted to a memory device associated with the receiving stations along with destination information for each particular item. The weight and destination is stored in the memory device for retrieval at a later time. The sorting apparatus further includes a conveyor operating to move the items from the receiving stations to their destinations. A recognition unit associated with the conveyor is located intermediate the receiving stations and the destinations and includes a scale in assocation with the memory device. The items are weighed a second time on the recognition unit scale and the weight information is transmitted to the memory device. A comparison is made between the weight information transmitted by the recognition unit scale and the stored weight information to identify the item currently at the recognition unit by its weight. After identification, the destination information previously stored for the item identified is retrieved from the memory device. The identified item is then moved from the recognition unit and a transfer device removes the item from the conveyor at a location determined by the destination information retrieved from memory for that item.

8 Claims, 3 Drawing Figures

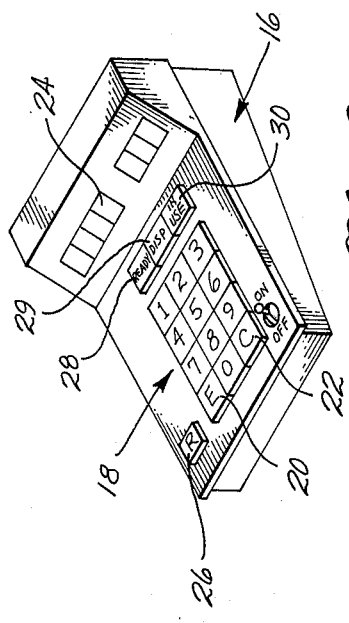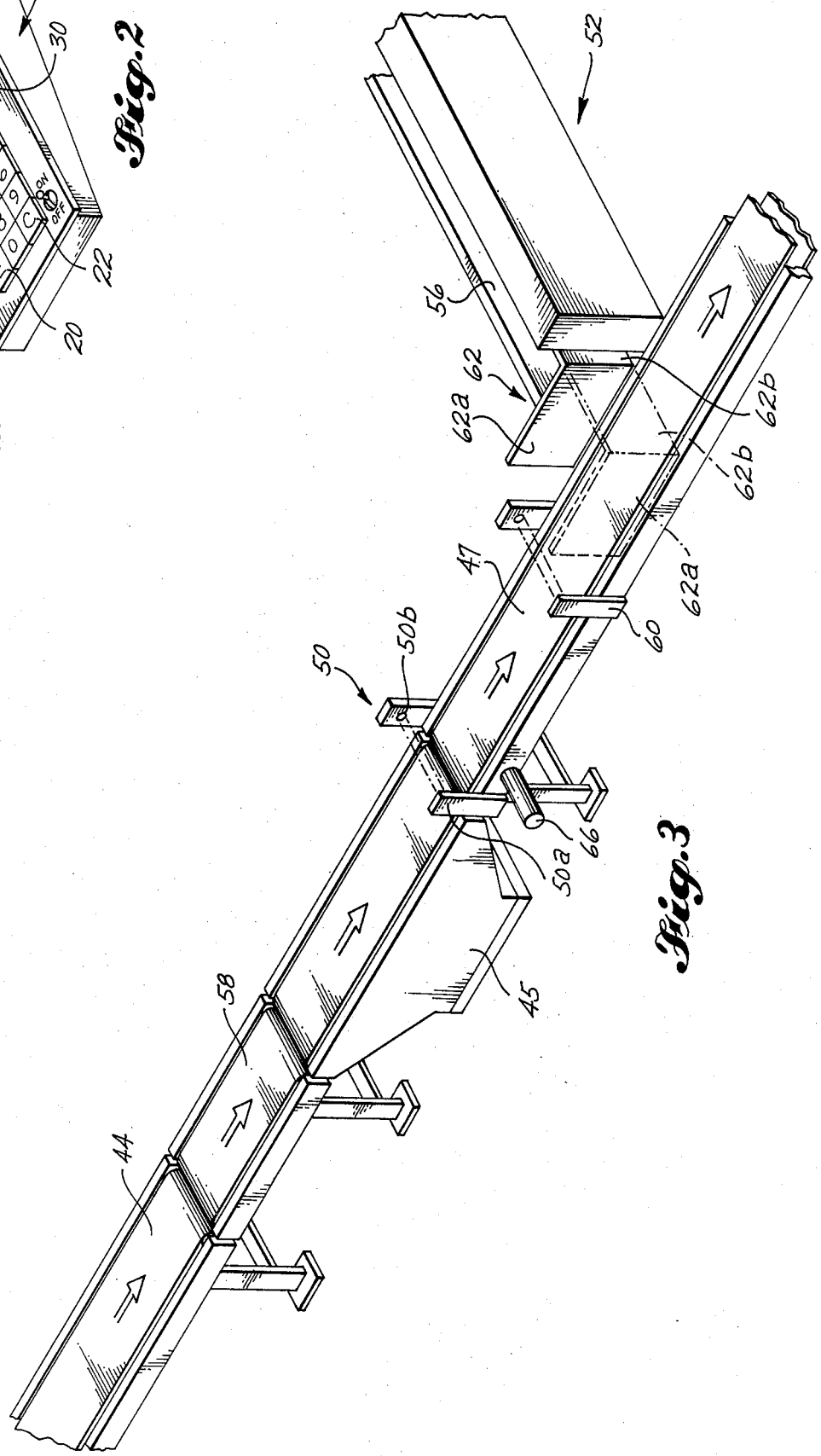

WEIGHT CODED DELIVERY CONVEYOR SYSTEM

BACKGROUND OF THE INVENTION

This invention relates to sorting apparatus and more particularly relates to sorting apparatus wherein the weight of each item is used to identify that item.

In many environments it is desirable to sort a multitude of items of varying shapes and sizes received at a number of input locations into several different defined categories. One example is in the baggage handling system of an airport where incoming baggage from passengers at various reception points must be sorted according to the flight number and destination of the passenger and routed to the proper baggage loading area associated with each flight.

In most airports, there are several stations which receive baggage from passengers for loading onto the airplanes. Baggage is received from passengers at the airline ticket counters and it is also received from passengers at curbside by sky caps or porters. Further, baggage is transferred from one flight to another by passengers changing airplanes. The baggage received at these various stations must somehow be routed to the flight line where it can be loaded onto the proper airplane as determined by the number of the flight to which the passenger is assigned and the destination of the passenger.

At the present time, most airports use a system in which tags are placed on the baggage when it is received from the passenger, the tag indicating the number of the flight to which the baggage is assigned. The baggage is then placed on a conveyor which moves the baggage from the reception point to a control station near the airplane flight line where a baggage attendant reads the tag and then routes the baggage according to the information contained on the tag. The above system is subject to human errors, either in reading the tag or in routing the bag to its proper destination resulting in lost and delayed baggage. Also, increasing wage pressures mean that the baggage system is expensive in terms of man hours of attendant time.

There are automatic baggage handling systems presently in use. Most of the automatic systems use a special tag which is affixed to the baggage and upon which the destination information is encoded in machine readable form. After the information is coded on the tag, the baggage is passed to a machine which can read the encoded information and which controls the destination of the bag in the airport terminal. The use of machine readable tags has certain disadvantages, one being that a certain amount of time is taken in preparing the tag and properly affixing it to the baggage. Also, it is generally necessary to position the bag in a certain orientation on the conveyor so that the tag is in proper position for reading. Further, the tags are subject to physical damage during the baggage handling process between the time the tag is attached and the time it is read. Damage to the tag can cause misreading of the encoded data on the tag thereby resulting in misdirected baggage.

It is therefore an object of this invention to provide an apparatus for sorting items that is automatic.

It is a further object of this invention to provide a sorting apparatus that eliminates the need for special tags or machine readable labels on the units being sorted.

It is another object of this invention to provide a sorting apparatus that does not require any special positioning of the units being sorted and that will accept units of varying size and shape.

It is also an object of this invention to provide a sorting apparatus that utilizes the weight of each item being sorted to identify that particular item.

BRIEF SUMMARY OF THE INVENTION

In accordance with the objects stated above, an apparatus for sorting items includes a plurality of receiving stations for receiving the unsorted items. Each of the receiving stations has associated with it a weighing means for sensing the weight of each item as it is received by the receiving station. The weight of each item is transmitted to a memory means associated with the receiving stations along with destination information for each particular item. The weight and destination information is stored in the memory means for retrieval at a later time. The sorting apparatus further includes a conveyor operating to move the items from the receiving stations to their destinations. A recognition unit is associated with the conveyor means intermediate the receiving stations and the destination locations. The recognition unit includes a second weighing means in operable association with the memory means. The items are weighed on the second weighing means and the weight information is transmitted to the memory means. A comparison is made between the weight information transmitted by the second weighing means and the stored weight information in order to identify the item currently at the recognition unit by its weight. After identification, the destination information which was previously stored in the memory means for the item identified is retrieved from the memory means. The item is then moved from the recognition unit and a transfer means removes the item from the conveyor at a predetermined location in response to the destination information retrieved from the memory means for that particular item.

BRIEF DESCRIPTION OF THE DRAWINGS

Further objects and advantages of the present invention will become apparent to those skilled in the art upon reading the ensuing specification in connection with the attached drawings wherein:

FIG. 2 is an isometric view of a control console for use in the receiving stations of the present invention;

FIG. 3 is a diagrammatic view of a portion of the baggage handling system of FIG. 1.

DETAILED DESCRIPTION OF THE PREFERRED EMBODIMENT

Figure 1:
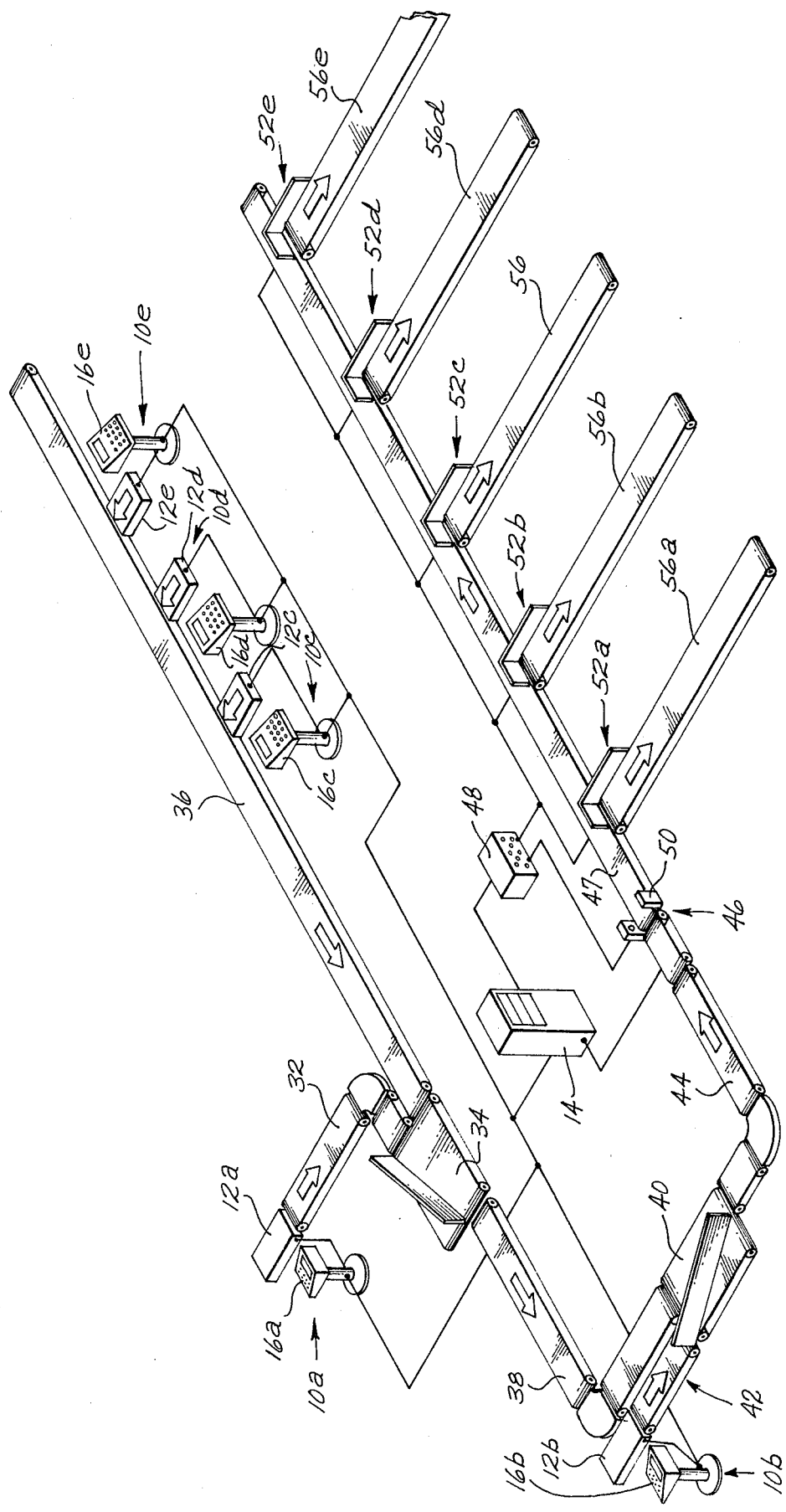
FIG. 1 is a diagrammatic representation of a baggage handling system incorporating the weight identification sorting apparatus of the present invention.

Although the sorting apparatus of the present invention can be used to sort many varied items and in several environments, for example, in the assembly line or shipping room of a manufacturing operation or in a mail facility, the invention will be described in detail herein in connection with a baggage handling system for use in an airport. It should be kept in mind that even though the system is being described in connection with an airport baggage handling system, it is also useful in other baggage handling systems, for example at a train depot or bus station.

Referring now to FIG. 1, a baggage handling system for use in an airport terminal includes a plurality of receiving stations 10a, 10b, 10c, 10d and 10e. Each of these receiving stations is identical in terms of the equipment located at the receiving station, however the receiving stations will be spaced at various points throughout the airport terminal. For example, receiving station 10a represents a curbside location where passengers driving up to the terminal can drop off their baggage and have it received into the handling system directly at curbside. The receiving station 10b represents a transfer point within the terminal where baggage from incoming flights can be transferred to outgoing flights in conjunction with passenger transfers from plane to plane and airline to airline. The receiving stations 10c, d and e represent ticket counter locations for either one or more airlines where passengers purchasing or picking up tickets can check in their baggage while they are receiving their tickets.

Platform scales 12a, b, c, d and e are repsectively associated with receiving stations 10a, b, c, d and e. The platform scales 12a–e are of the conventional type and preferably are of the type supplying a digitally encoded signal representative of the weight of an item being weighed on the scale. Examples of scales commercially available that could be used in a system made in accordance with principles of the present invention are the Model 2184 and 2084 scales manufactured by Toledo Scale Division of Reliance Electric Company, Toledo, Ohio 43612, the Model EF-100-085-S scale manufactured by Cardinal Scale Manufacturing Company, P.O. Box 151, Webb City, Missouri 64870, or the Model H70-4000-1 digital bench scale manufactured by Fairbanks Weighing Division of Colt Industries, St. Johnsbury, Vermont 05819. For use in a baggage handling system as illustrated and described, the scales would preferably have a range of 0 to 100 lbs. in increments of 0.05 lbs with an accuracy of ±0.01 percent of the full scale value. For sorting applications other than baggage handling, the capacity and accuracy of the scale could be chosen for the particular application.

The outputs of the scales 12a–e are routed to a memory device to be stored for retrieval at a later time. In the illustrated embodiment, the memory device used is a memory section of a programmable digital computer 14. Although a computer is illustrated it would be possible to use any one of several memory devices. The requirements for the memory device are that it be able to receive and store the weight representation signal produced by the scale and be accessible to retrieve the information at a later time and to change the contents of a given memory location to reflect the constant turnover of baggage being handled in the system. Also, it must be possible to store information representing the destination of the baggage (i.e., flight number, city or some other designator) in the memory and associate the destination information with the weight information stored for each particular bag.

Each of the receiving stations 10a–e has associated with it one of the input consoles 16a–e respectively. The input consoles 16a–e are in communication with the central computer 14 and enable an operator to enter the fight number, destination city, or some other destination representative character or series of characters into the computer memory along with the weight of the bag that is being sent to the computer by the scale so that the baggage weight and flight number or other destination representative characters are stored in a paired relationship in the computer memory.

A typical input console 16 is shown in FIG. 2 and includes a standard keyboard 18 containing numbered keys for the entry of the flight number or other destination representative characters. The console further includes an "ENTRY" (E) key 20 which when depressed gates the flight number into the computer memory in association with the weight information that the computer is presently receiving on its input data lines for the baggage item that is on the associated scale at that time. A "CLEAR" (C) key 22 is provided to enable the operator to clear an entry if an error is made. A display panel 24 displays the flight number or other destination representative characters that are punched in by the operator so that the numbers can be checked for accuracy prior to entering the numbers into memory. Preferably the console 16 also includes a "REPEAT"(R) key 26. In the circumstance where a number of bags are received that are destined for the same flight the REPEAT key can be used to enter the flight number for the bags into memory as they are successively placed on the scale without requiring the operator to reconstruct the entire flight number for each entry. The console preferably also includes a "READY" display 28 that lights upon receiving a signal from the computer to indicate to the operator that the computer is available to accept the destination information and an "IN USE" display 30 that lights to signal the operator that the system is not available for data input for whatever reason.

Further, the console 16 preferably also includes a DISPATCH (Disp) display 29. The DISPATCH display is lit by a command from the computer. The computer generates the DISPATCH command when the data transmitted to the computer upon the operator's depressing the ENTER key has been received and validated. The DISPATCH display indicates to the operator that the data necessary to route the bag has been stored in the computer and the bag may be moved from the receiving station sale onto the conveyor system. If there were some problem with the data transmitted to the computer, for example, if an invalid flight number were entered, the DISPATCH command would not be generated and the DISPATCH display would not light until the operator re-entered a valid flight number.

The receiving stations are all located in close proximity to a conventional conveyor belt system to carry the luggage from the receiving station to its final destination within the terminal. For example, receiving station 10a is located adjacent a conveyor belt portion 32 that carries baggage from the scale 12a to a conventional merge conveyor 34. At the merge conveyor 34, baggage travelling on conveyor portion 32 merges with baggage traveling on conveyor section 36 coming from receiving stations 10c, d and e, that is, baggage from receiving stations 10a, c, d and e arriving at merge conveyor 34 on two separate conveyor portions 32 and 36 leaves on a single conveyor portion 38. Conveyor portion 38 leads to a second merge conveyor 40 where the baggage is merged with baggage on conveyor portion 42 coming from receiving station 10b. After leaving the second merge conveyor 40, the baggage travels on a conveyor portion 44 which leads to a recognition unit 46.

The entry of the bags onto the merge conveyors 34 and 40 is controlled in a conventional manner so that the bags remain in single file and are not merged side by side.

A typical manner of controlling the entry of the bags onto the merge conveyor is to provide a conveyor controller that stops and starts one of the conveyors leading to the merge conveyor in such a manner that two bags cannot enter the merge conveyor simultaneously. Sensors, e.g., photocell units, are provided just ahead of the entry points of the bags onto the merge conveyor to sense the presence of a bag about to enter the merge conveyor. The outputs of the sensors are coupled to the conveyor controller. Usually one of the conveyors feeding the merge conveyor is given priority so that when the conveyor controller senses that two bags are about to enter the merge conveyor simultaneously it will stop the nonpriority conveyor and allow the priority conveyor to feed its bag to the merge conveyor alone. When the conveyor controller senses from the photocell signals that there is a gap in the flow of baggage on the priority conveyor it will restart the nonpriority conveyor and bags from the nonpriority conveyor will again enter the merge conveyor until such time as it appears that two bags are about to enter simultaneously at which time the controller will repeat the above described process of stopping the nonpriority conveyor. The bags therefore enter the merge conveyor in single file and leave in single file.

The recognition unit 46 includes a platform scale 45 built into a conveyor where the baggage is weighed a second time. The scale 45 in the recognition unit 46 is of the same type as the scales 12a-e. The output of the scale 45 is connected to the computer 14. When a bag is weighed by the scale 45 in the recognition unit the weight information is transmitted to the computer 14. The computer searches its memory for a match between the weight transmitted by the scale 45 and the stored weight representative data in the computer memory until it finds a match. When a match has been achieved, the identity of the baggage item that is currently on the recognition unit 46 is known and the associated flight number data or other destination identifying code for that particular baggage item can be retrieved. After the bag is identified and the destination information retrieved from memory, those memory locations associated with the identified bag are available for weight and destination information from a new baggage item being received at the receiving stations. The computer then utilizes the retrieved destination information to determine which baggage accumulation station the bag is to go to and sends the bag to its destination. It is possible that the destination code that is entered into memory at the time the bag is received is an identifier for the baggage accumulation station associated with the desired flight. To accomplish this, it would be necessary to provide each baggage handler, ticket clerk or porter with a table listing the baggage accumulation station identifier for each flight.

A more efficient and preferred method of handling the problem is to have the flight number entered into memory by the baggage handler and then utilize the computer to convert the flight number to a baggage accumulation station according to a data table stored in the computer. The data table giving the correlation between flight number and accumulation station could then be easily updated for changing flight schedules and in the case of equipment failures causing unexpected changes in baggage accumulation station availability.

The bag leaves the recognition unit 46 on a conveyor portion 47 that takes the bag to the baggage accumulation locations for the various flights. A photocell unit 50 is located at the exit end of the recognition unit 46. The photocell unit 50 includes a light source 50a that sends a beam of light across the path of the baggage to a photodetector 50b. As the bag leaves the recognition unit it interrupts the light beam to the photodetector 50b. The interruption of the beam causes the photodetector to send a signal to the control computer 14 alerting the computer that the bag has left the recognition unit. The computer then monitors signals received from an analog position monitor 48 associated with the conveyor portion 47 to keep track of the bag location as discussed in greater detail below.

When the computer senses from the position monitor signals that the bag is at the desired baggage accumulation location it activates one of the sort pullers 52a-e to remove the bag from the conveyor 47 and place it on the proper one of flight storage conveyors 56a-e associated with the desired baggage accumulation site.

The structure and operation of the sort puller and recognition unit is further illustrated at FIG. 3. The recognition unit 46 includes a conventional metering conveyor 58 which controls the flow of baggage from the conveyor portion 44 so that only one bag at a time is present on the scale 45 of recognition unit 46. The position monitor 48 can be any conventional means for keeping track of the position of an item moving on a conveyor. For example, the position of the bag can be kept track of by means of photocell units placed at spaced locations along the conveyor 47. The location of the bag will correspond to either the number of photocell units passed or a signal from a particular photocell unit as the bag passes it. For example, as shown in FIG. 3, when the bag passes photocell unit 60 the computer will sense that the bag is in position to be removed from the conveyor by the sort puller 52. It should be kept in mind that the computer must keep track of the order of the bags as they leave the recognition unit and note the removal of any bag so that the sequence of the bags can be updated as the bags are removed since the removal of the bags can be in other than serial order.

Alternatively, a photocell unit can be used merely to keep track of the departure time of the bag from the recognition unit 46 and a conventional analog encoder unit or tachometer 66 could be directly fastened to the conveyor belt drive wheels to monitor belt speed in order to determine how far the bag has traveled as a function of belt speed and time.

In any event, when the bag has reached the proper location as determined by the central computer 14 the sort puller 52 is activated to remove the bag from the conveyor 47. The sort puller 52 includes a suitably supported and guided L-shaped paddle 62 that moves transversely across the conveyor in front of the selected bag and then retracts, pulling the bag along with it thus, removing the bag from the conveyor. When the sort puller is activated by the computer the paddle 62 extends from the main frame of the sort puller such that the portion 62a parallel to the conveyor direction of motion is now located on the other side of the conveyor and the portion of the paddle 62b transverse to the conveyor motion lies across the conveyor blocking passage of the bag. When the sort puller has been extended for a time period long enough for the bag to be within its grasp, the paddle 62 is then retracted to its normal position pulling the bag along with it onto the storage conveyor 56. Once the bags are accumulated on the storage conveyor 56, they can be removed by flight attendant personnel and placed in the baggage compartment of the aircraft.

In summary therefore, an apparatus for sorting items is disclosed, the apparatus using the weight of an individual item as an identifying characteristic by which the item is categorized along with destination information. The item is weighed prior to placement on a conveyor. The item weight and associated destination information is loaded into the memory of a control computer and the item is conveyed to a recognition unit where it is again weighed and the second weight compared to the weights stored in the computer memory in order to identify the item. When the identification has been made, the destination information associated with the particular item is retrieved from memory and utilized by the computer to activate a transfer means to remove the item from the conveyor at its predetermined destination in response to the destination information.

As discussed above, the scale preferably should be of the type having a digital output which can be easily tied into a computer memory, however analog outputs could also be used with an analog to digital converter inserted between the scale output and the computer memory.

The sort pullers described and illustrated are conventional items manufactured by The Boeing Airport Equipment Company of Dallas, Texas. While the sort pullers illustrated are the preferred means for removing the bags from the conveyor, any suitable means can be used so long as it can be operated selectively to remove the bags at the proper locations as determined by the destination information stored in the memory.

Although a system for handling baggage in an airport terminal is described and illustrated, it will be apparent to those of ordinary skill in the art and others that the sorting system of the present invention is useful in several other sorting applications and as discussed above changes can be made in the described embodiment while remaining within the scope of the invention as defined in the claims.

The embodiments of the invention in which an exclusive property or privilege is claimed are defined as follows:

1. An apparatus for sorting items comprising:
a conveyor for carrying the items to be sorted;
a plurality of receiving stations located along said conveyor for receiving said items to be sorted, each of said receiving stations including first weighing means for sensing the weight of each item and for producing a signal representative of the weight, each receiving station further including manual input means operable to produce a signal representative of a predetermined destination of each of said items;
computational means operably associated with said receiving stations, said computational means including memory means for storing said weight representative signal for each item along with the associated destination representative signal for that item and data retrieval means for selectively retrieving said weight and destination representative signals;
a recognition unit located in the path of said conveyor downstream of said receiving stations for identifying each item according to the stored weight representative signal, said recognition unit including a second weighing means for sensing the weight of said items as they pass through said recognition unit and producing a second weight representative signal, said recognition unit being operably associated with said computational means to match said second weight representative signal with the stored weight representative signals to identify said item in said recognition unit and said data retrieval means being operable upon such identification to retrieve the stored predetermined destination representative signal associated with said weight identified item;
transfer means operably associated with said computational means and said conveyor, said transfer means including item removal means for removing said identified item from said conveyor at said predetermined destination downstream from said recognition unit in response to said retrieved destination representative signal.

2. The apparatus of claim 1 wherein said recognition unit includes a metering conveyor located upstream of said second weighing means for metering the flow of said items to be sorted such that only one of said items is present on said second weighing means at any time.

3. The apparatus of claim 1 wherein said item removal means includes:
position monitoring means operably associated with said conveyor and said computational means, said position monitoring means being located downstream of said recognition unit for producing a signal representative of the distance said items have traveled since leaving the recognition unit, said computational means being operable in response to said distance representative signal and said retrieved predetermined destination signal to produce an item removal signal;
paddle means operably associated with said conveyor and said computational means, said paddle means being normally adjacent said conveyor and out of the path of said items on said conveyor, said paddle means being operable in response to said item removal signal to extend transversely across said conveyor into the path of said items and being thereafter operable to retract to its normal position to selectively remove items from said conveyor.

4. The apparatus for claim 1 wherein said computational means is a programmable digital computer.

5. The apparatus of claim 4 wherein said manual means includes a console having a keyboard in communication with said computer operable to formulate a destination code representative of the destination of an item at its associated receiving station and further operable to transfer the destination code to the computer while at the same time gating the weight representative signal for the item to the computer, the computer being operable to store the destination code and weight representative signal in a predetermined sequence in the memory means so as to maintain an association between said destination code and said weight representative signal.

6. The apparatus of claim 5 wherein said keyboard further includes a repeat key for repeatedly transfering a destination code to said computer without the necessity of reformulating the destination code upon each transfer.

7. The apparatus of claim 5 wherein said console further includes display means operably associated with said computer for indicating that the computer is ready to receive weight and destination representative signals from said first weighing means and said manual input means.

8. A method of sorting items comprising the steps of:
(a) receiving the items to be sorted;
(b) producing a signal representative of the weight of each item;
(c) producing a signal representative of a predetermined destination of each item;
(d) storing the weight representative signals of each item in a memory means;
(e) storing the predetermined destination representative signals of each item in said memory means so that a paired relationship exists between the weight signal and destination signal for each item;
(f) moving the items to a recognition unit and producing a second weight representative signal for each item;
(g) comparing said second weight representative signal with said stored weight representative signals to identify each of said items according to its weight;
(h) retrieving from the memory means said predetermined destination representative signal associated with an identified item; and
(i) moving said identified item to its destination in response to said retrieved predetermined destination signal.

* * * * *

UNITED STATES PATENT AND TRADEMARK OFFICE
CERTIFICATE OF CORRECTION

PATENT NO. : 4,239,434

DATED : December 16, 1980

INVENTOR(S) : Donald N. Gannon

It is certified that error appears in the above-identified patent and that said Letters Patent are hereby corrected as shown below:

Column 3, line 20: "repectively" is changed to --respectively--.

Column 8, line 48: --input-- is inserted after "manual".

Signed and Sealed this

Fourteenth Day of April 1981

[SEAL]

Attest:

RENE D. TEGTMEYER

Attesting Officer     Acting Commissioner of Patents and Trademarks